No. 889,959. PATENTED JUNE 9, 1908.
J. F. O'SHAUGHNESSY.
APPARATUS FOR GATHERING COTTON.
APPLICATION FILED FEB. 13, 1908.
2 SHEETS—SHEET 1.
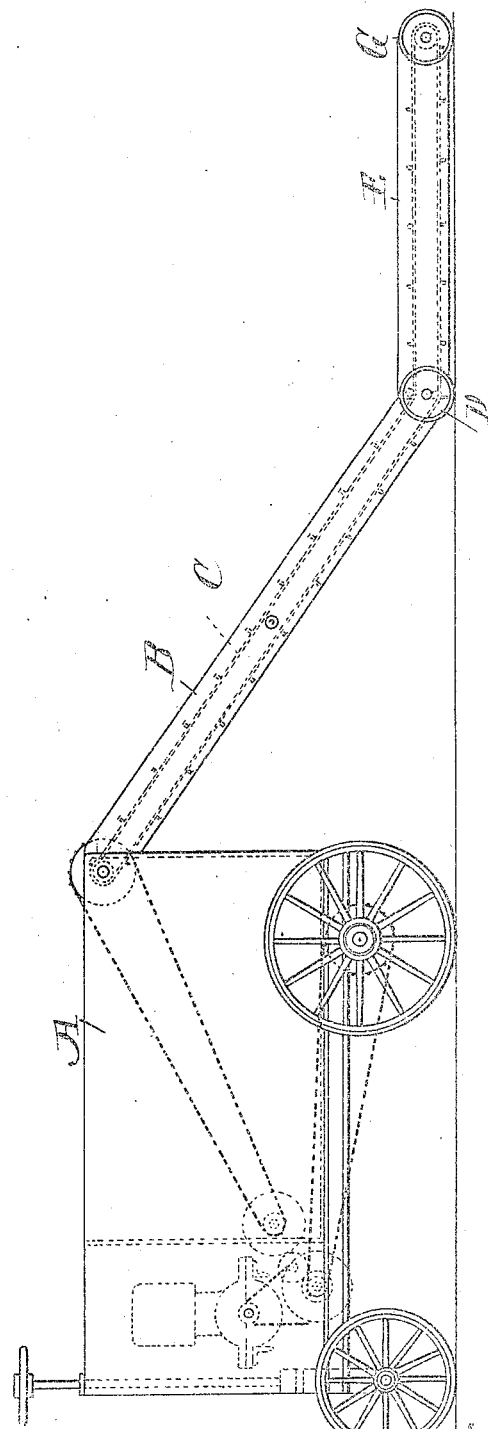

No. 889,959. PATENTED JUNE 9, 1908.
J. F. O'SHAUGHNESSY.
APPARATUS FOR GATHERING COTTON.
APPLICATION FILED FEB. 13, 1908.
2 SHEETS—SHEET 2.
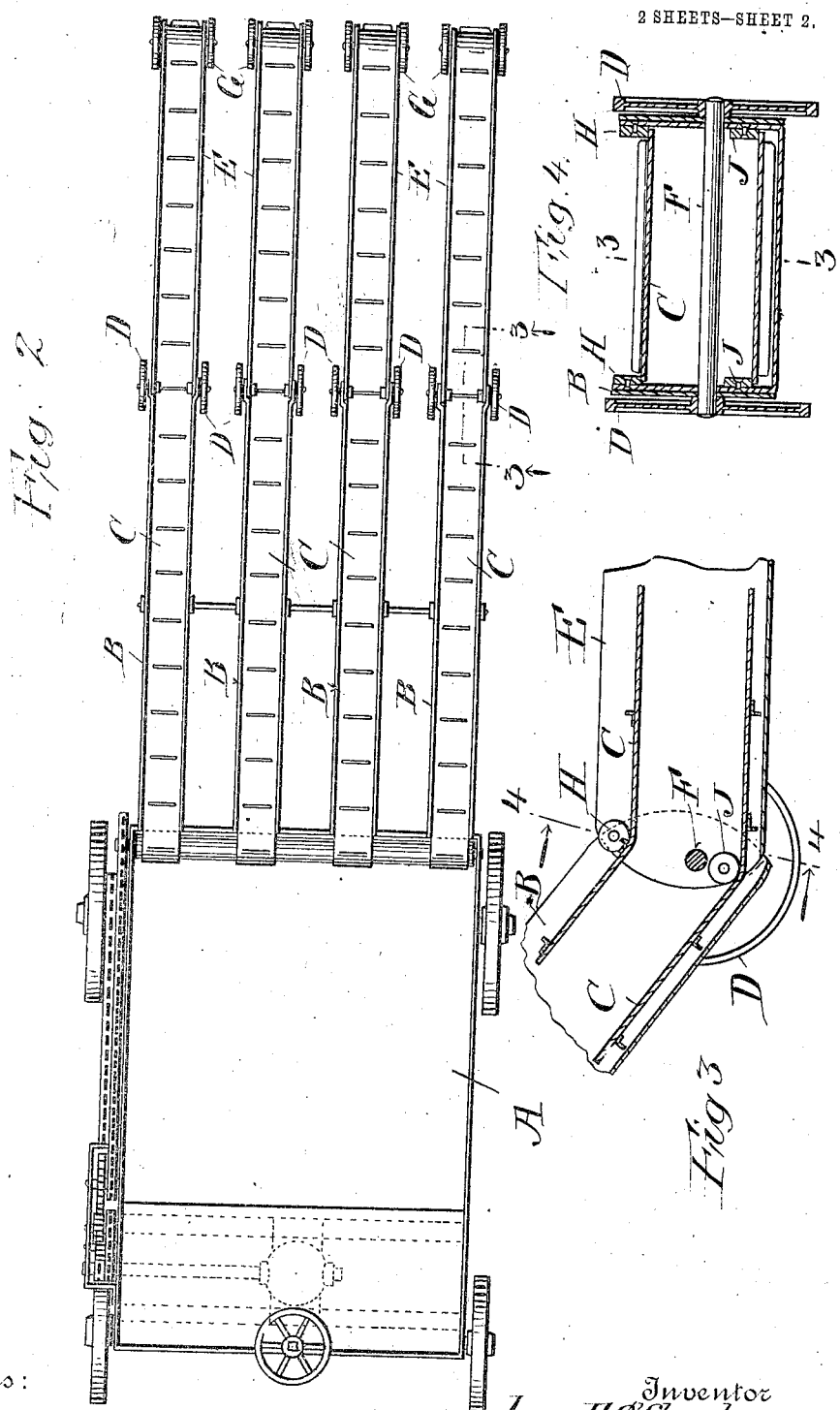

UNITED STATES PATENT OFFICE.

JAMES F. O'SHAUGHNESSY, OF NEW YORK, N. Y.

APPARATUS FOR GATHERING COTTON.

No. 889,959.      Specification of Letters Patent.      Patented June 9, 1908.

Application filed February 13, 1908. Serial No. 415,677.

*To all whom it may concern:*

Be it known that I, JAMES F. O'SHAUGH-NESSY, a citizen of the United States, residing at New York, in the county of New York and State of New York, have invented a new and useful Apparatus for Gathering Cotton, of which the following is a specification.

The invention relates to apparatus for gathering cotton.

The object of the invention is to provide a machine which is simple in construction, economical in manufacture, and efficient in operation, for receiving the cotton picked manually, whereby the cotton picker or operator is relieved of the labor of transporting the cotton picked by him, and of the physical wear and strain of repeatedly bending and straightening his body during the operation of picking or gathering the cotton, while at the same time he is free to employ both hands with which to pick the cotton.

In my Patent No. 843,294, granted to me February 5, 1907, I have shown, described and claimed an apparatus for gathering cotton, embodying in its construction features for the accomplishment of the foregoing objects. In said patent I employ a vehicle, which is adapted to be moved through the field, and is provided with a suitable receptacle to receive the picked cotton, and is also provided with one or more traveling carriers extending from the body of the vehicle, and trailing therefrom, and designed to extend from the receptacle between adjacent rows of cotton stalks, and upon which the cotton picked or gathered by the operator, using both hands freely, is deposited, whereby such cotton so deposited is elevated or carried to, and deposited in the receptacle.

The present invention relates to a machine or apparatus of this general character, and as its special feature of improvement thereover embodies an arrangement of the carriers, whereby at its other lowest extremities they are provided with means for extension thereof horizontally therefrom, the object being to provide a trailing carrier depending or extending from the upper edge of the rear end of the receptacle downwardly and rearwardly therefrom, or otherwise, and thence horizontally so as to afford increased facilities for the operation of receiving and depositing the picked cotton into the receptacle.

The invention consists substantially in the construction, combination, location and arrangement of parts all as will be more fully hereinafter set forth, as shown in the accompanying drawings and finally pointed out in the appended claims.

Referring to the accompanying drawings and to the various view and reference signs appearing thereon, Figure 1, is a view in side elevation of an apparatus for gathering cotton, embodying the principles of my invention. Fig. 2, is a view in top plan of the same. Fig. 3, is a broken detail view in section on the line 3, 3, Figs. 2 and 4. Fig. 4, is a transverse section on the line 4, 4, Fig. 3.

The same part is designated by the same reference sign wherever it occurs throughout the several views.

The vehicle may be of any desired type, size or construction, and adapted to be supported on suitable wheels. In the particular form shown, as illustrative of an operative embodiment of my invention, a motor vehicle is employed, having a receptacle A. It is obvious, however, that any form of vehicle may be used, and the vehicle may be steered and propelled in any suitable or convenient manner, suitably hinged or pivoted at or adjacent the upper edge of the rear end of the receptacle A, are trailing carrier frames B. Any desired number of these frames may be employed. I have shown four. These frames are designed to be spaced apart a distance sufficient to accommodate a row of cotton stalks therebetween. Mounted upon each frame is a traveling carrier C, adapted to be driven in any suitable or convenient manner as indicated in the drawings. The rear end of each carrier frame may be supported upon the ground in any suitable or convenient manner as, for instance, by means of the rollers or wheels D. I do not desire, however, to be limited or restricted in this regard, as the lower end of the carrier frames B, may rest directly upon the ground, or be supported therefrom in any other suitable or convenient manner.

The construction and arrangement so far described is substantially the same as that shown, described and claimed in my former patent above noted. I have found in practice that the efficiency of a machine or apparatus embodying these principles of construction is largely dependent upon the speed at which the machine or apparatus moves or is propelled through the field and along the rows of cotton stalks. Under ordinary conditions the speed of movement of the vehicle may be increased by increasing the facilities for accommodating the work or output of the operators, that is, by increasing the length of carrier C, or frame B, a larger number of operators may be employed as it is possible to accommodate a larger number of operators with a carrier of extended length. The practical difficulty of accomplishing this object, however, is in providing very long trailing carriers, thereby making it difficult to turn the machine at the ends of the rows of cotton. To overcome this objection and at the same time to secure the advantages of an extended length of carrier, I propose to provide an auxiliary carrier frame E, for each frame B. These auxiliary frames are hinged or pivotally connected in any suitable manner to the lower trailing ends of the frames B, and extend rearwardly and horizontally therefrom. These auxiliary hinged or pivoted frames are pivotally connected as, for instance, by the pivot pin F, or otherwise, to the trailing ends of the frames B. In the particular form shown, to which my invention is not to be limited, these auxiliary frames are hinged or pivoted to the axle of the supporting wheels or devices D. The free ends of the auxiliary frames E, may be supported in any suitable or convenient manner as, for instance, upon rollers or wheels G, similar to the wheels D, but it is obvious that such free ends may be otherwise suitably supported. At their front ends, the auxiliary frames E, carry depressing or guide rollers H, J.

The traveling carriers C, operate over pulleys, respectively mounted at the upper ends of the auxiliary frames B, and the extreme rear or free end of the auxiliary frames E, being driven from the upper pulleys. The upper ply or leg of the traveling carrier operates under the guide rollers H, which engage the edges of the carrier, and the lower leg or ply of the traveling carrier operates under the guide rollers J, at the front end of the auxiliary frames. In this manner, and by this means the traveling carriers, or the legs, or plies thereof extend rearwardly and downwardly, lengthwise of the carrier frames B, and thence underneath the deflecting rollers H, and thence horizontally along the auxiliary frames to and over the guide rollers at the extreme rearmost or free ends of such auxiliary frames, thence forwardly along the auxiliary frames underneath the deflecting or guide rollers J, thence upwardly along the frames B, and over the driving rollers at the upper ends of such frames, thereby materially extending the length of the carriers, and enabling a larger number of operators to be employed in connection with each carrier, and hence enabling the machine to be operated more rapidly, and to cover a field of a given area more quickly than is otherwise possible, and hence shortening the time required to harvest the cotton crop. It will also be seen that the horizontally extending auxiliary frames are hinged or pivoted, so that in turning the machine at the ends of the rows of cotton stalks, said auxiliary frames may be swung or folded over upon the trailing frames B, and hence undue and objectionable length of carrier frame is avoided.

Another advantage derived from the construction and arrangement above described is that the horizontal portion affords means for accommodating young people who might otherwise find the cotton picking operation too laborious and toilsome to undertake, and besides, being close to the ground, the cotton which grows lowest on the stalks may be gathered and delivered into the carrier receptacle with greater facility.

Having now set forth the object and nature of my invention, and a construction embodying the same, what I claim as new and useful and of my own invention, and desire to secure by Letters Patent is:—

1. In an apparatus for gathering cotton, a vehicle having a receptacle, frames extending freely from the end of the vehicle, and spaced apart to accommodate a row of cotton stalks therebetween, horizontally extending frames forming extensions of said first mentioned frames, carriers mounted on said frames and operating along the same and the horizontal extensions thereof, said carriers delivering into said receptacle, and means for actuating said carriers.

2. In an apparatus for gathering cotton, a vehicle having a receptacle, a frame trailing from the rear end of said receptacle, an auxiliary frame pivoted to the lower or trailing end of said first mentioned frame, and forming a horizontal extension thereof, a carrier operating along said frame and its extension, and delivering into said receptacle, and means for actuating said carrier.

3. In an apparatus for gathering cotton, a vehicle having a receptacle, a frame trailing from the rear end of said receptacle, an auxiliary frame pivoted to the trailing end of said first mentioned frame, and forming a horizontal extension thereof, deflecting rollers carried by said auxiliary frame, a carrier operating along said frames and engaged by said deflecting rollers, said carrier delivering into said receptacle and means for actuating said carrier.

4. In an apparatus for gathering cotton, a vehicle having a receptacle, a frame trailing from the rear end of said receptacle, and accommodated between adjacent rows of cotton stalks, an auxiliary frame pivoted to the trailing end of said first mentioned frame, and forming a horizontal extension thereof, deflecting rollers carried at the forward end of said auxiliary frame, a carrier operating along said frames and engaged at its edges by said deflecting rollers to guide or deflect the same from one to the other of said frames, said carrier delivering into the receptacle, and means for actuating said carrier.

In testimony whereof I have hereunto set my hand in the presence of the subscribing witnesses, on this 8th day of February, A. D. 1908.

JAMES F. O'SHAUGHNESSY.

Witnesses:
JOSEPH KLEIN,
S. E. DARBY.